United States Patent [19]
Wallack

[11] Patent Number: 5,842,201
[45] Date of Patent: Nov. 24, 1998

[54] METHOD ARTICLE OF MANUFACTURE AND APPARATUS FOR USER CONTROLLED AND AUTOMATIC RETRIEVAL AND DISPLAY OF DETAILED DATA

[75] Inventor: Peter Wallack, Sunnyvale, Calif.

[73] Assignee: Oracle Corporation, Redwood Shores, Calif.

[21] Appl. No.: 641,785

[22] Filed: May 2, 1996

[51] Int. Cl.$^6$ .................................................. G06F 17/30
[52] U.S. Cl. .................. 707/3; 707/2; 707/4; 707/100; 707/102; 705/7
[58] Field of Search .................................. 707/1, 2, 3, 4, 707/102, 103, 104, 2.3, 100; 364/468.01; 395/200.52; 455/408; 705/7

[56] References Cited

U.S. PATENT DOCUMENTS

| | | | |
|---|---|---|---|
| 5,191,522 | 3/1993 | Bosco et al. ................................... | 705/4 |
| 5,201,046 | 4/1993 | Goldberg .................................. | 707/100 |
| 5,570,291 | 10/1996 | Dudle .................................. | 364/468.01 |
| 5,611,076 | 3/1997 | Durflinger et al. ...................... | 707/102 |
| 5,655,013 | 8/1997 | Gainsboro ................................ | 379/188 |
| 5,694,608 | 12/1997 | Shostak ............................................ | 1/1 |

*Primary Examiner*—Thomas G. Black
*Assistant Examiner*—Diane D. Mizrahi
*Attorney, Agent, or Firm*—Fliesler, Dubb, Meyer & Lovejoy

[57] ABSTRACT

A method and apparatus for retrieving and displaying detail data is provided which allows a user to dictate the timing of detail data retrieval. Upon selection of a master record, if a user indicates that he wishes to immediately view the detail data associated with the master record, and if the window that actually displays that data is currently visible to the user, then the detail data is automatically retrieved and displayed. Conversely, if the user indicates that he does not need to view the detail data, and if the window that would actually display such data is currently visible to the user, then no detail data is retrieved or displayed until the user affirmatively requests it (that is, "activates" the master record). In all cases, if the window that will actually display such detail data is not visible to the user, the data in that window is not retrieved. Thus, detail data is retrieved and displayed only when necessary (i.e. the user wishes to view it), and retrieval is automatic if the user wishes it to be. Hence, an optimal balance is struck between performance and convenience.

4 Claims, 3 Drawing Sheets

METHOD ARTICLE OF MANUFACTURE AND APPARATUS FOR USER CONTROLLED AND AUTOMATIC RETRIEVAL AND DISPLAY OF DETAILED DATA

BACKGROUND OF THE INVENTION

1. Field of the Invention

The present invention relates generally to retrieval of information and, in particular, to user-controlled retrieval and display of detail information from a database.

2. Description of the Related Art

A database management system, for example, a relational database management system ("RDBMS") typically stores large amounts of information which may be retrieved, accessed, and/or displayed. Typically, the information, or specifically data, includes many levels of hierarchically related data. In other words, the data may be related to, and consist of, different levels of detail data.

For example, in a software application for coordinating purchasing, if a user wishes to access purchase order data in a database, the user would be provided with purchase order data consisting primarily of a single "header" and one or more "lines". The "header" data may describe general information regarding the purchase order, such as vendor information. The "lines" data may identify the specific items to be purchased or ordered. Additionally, each row of "lines" data may be related to one or more "shipments". For example, a particular item ordered on a "line" may have one or more dates on which it will be shipped, each stored as a "shipment". Such relations between the "header" and "lines" data, as well as the "lines" and "shipments" data, are typically referred to as "master-detail" relations.

Master-detail relations provide an efficient means for storing information in an organized manner. The difficulty arises when it comes time to retrieve and display the detail data. This difficulty involves the clash of two main concerns: (1) system performance; and (2) convenience. System performance dictates that detail data be retrieved and displayed only when absolutely necessary. This serves to limit the amount of queries that are executed to locate the proper data, and the amount of data transmitted on the network (if any) between the server and client computers. On the other hand, convenience dictates that detail data be retrieved and displayed whenever the master data is displayed. This eliminates the need for the user to affirmatively request detail data each and every time he wishes to view detail data. As can be seen, these two concerns often clash; as a result, several different approaches have been taken in the prior art.

In one prior art approach, detail data is immediately retrieved whenever a master record, such as a "header" or "line", is selected. While this approach is convenient for viewing data, it has a significant performance drawback in that it may give rise to a significant amount of unnecessary processing and data traffic. For instance, there may be many situations in which it is not necessary to retrieve detail data, such as when the detail data window is not visible or when a user is interested in seeing only the data of the master record. To retrieve detail data in such situations would be to waste system resources and to degrade system performance. Despite the obvious shortcomings, this prior art approach nonetheless retrieves detail data whenever a master record is selected.

According to another prior art approach, detail data for a master record is displayed in a "modal" window whenever the user affirmatively requests the detail data. This modal window, when displayed, prevents a user from interacting with other display information and/or windows until the modal window is dismissed. While this approach is resource-efficient in that it retrieves and displays detail data only when absolutely necessary, it is inconvenient to use. This inconvenience mainly arises from the fact that: (1) the user always has to affirmatively request the detail data; (2) the modal window prevents the user from freely moving from window to window; and (3) master records typically cannot be viewed concurrently with the detail data.

As shown by the above discussion, neither prior art approach provides satisfactory results. What is needed is a detail data retrieval and display approach which strikes an optimal balance between performance and usability. No such approach is believed to currently exist.

SUMMARY OF THE INVENTION

According to the present invention, there is provided a computer-implemented method for retrieving and displaying detail data which allows a user to dictate the timing of detail data retrieval. If the user indicates that he wishes to immediately view the detail data, and the window that actually displays that data is currently visible to the user, then the detail data is automatically retrieved whenever a master record is selected. Conversely, if the user indicates that he does not need to view the detail data, and the window that would actually display such data is currently visible to the user, then no detail data is retrieved or displayed until the user affirmatively requests it (that is, "activates" the master record). In all cases, if the window that will actually display such detail data is not visible to the user, the data in that window is not retrieved. Thus, according to the present invention, detail data is retrieved and displayed only when necessary (i.e. the user wishes to view it), and retrieval is automatic if the user wishes it to be. Therefore, an optimal balance is struck between performance and convenience.

BRIEF DESCRIPTION OF THE DRAWING

Other advantages of the invention will become apparent upon reading the following detailed description and upon reference to the drawing in which.

DETAILED DESCRIPTION

A. Hardware and Software Architecture

Figure 1:
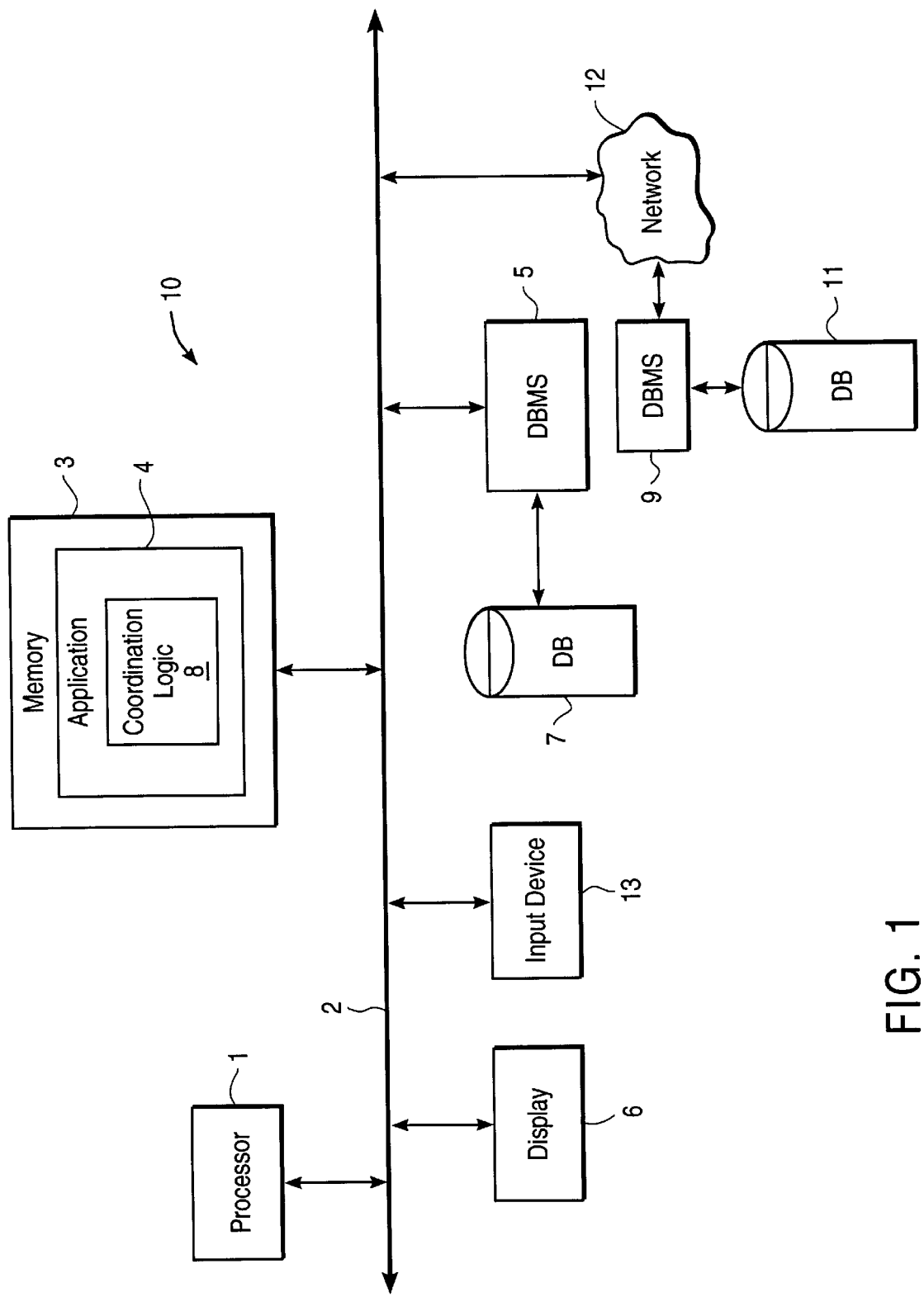
FIG. 1 is a block diagram illustrating a hardware and software embodiment according to the present invention.

FIG. 1 illustrates an apparatus 10 according to the present invention. In an embodiment, apparatus 10 may be a general purpose computer or the like. Components in apparatus 10 are coupled to data and control bus 2. The components coupled to bus 2 include, but are not limited to, display 6, processor 1, input device 13, memory 3 and database management system ("DBMS") 5. Mass storage 7, which typically takes the form of a hard disk drive, is coupled to DBMS 5. Mass storage 7 stores the actual database data. In an embodiment, master-detail data is stored in mass storage 7 and accessed by DBMS 5.

The embodiment described thus far is a "local" embodiment. That is, the DBMS 5 is directly coupled to the bus 2 and hence is a part of system 10. In an alternative embodiment, the DBMS 9 and the mass storage 11 are remote to the system 10. In such an embodiment, the system communicates with the DBMS 9 via a network 12. Network 12 may be either a wired or wireless network. Because a network is involved, it is in this embodiment that efficiency concerns becomes critical. System performance will degrade, not only for system 10 but for other users on the network, if excessive and unnecessary traffic is imposed on the network 12. Since the present invention serves to limit unnecessary detail data retrieval from a database, it will be especially advantageous in the network environment.

In an embodiment, memory 3 contains the computer instructions which are executed by processor 1 to carry out the functions of the system 10. These instructions include application program 4 and the coordination logic 8 of the present invention. It is coordination logic 8 which controls the retrieval and display of detail data. In the embodiment shown in FIG. 1, coordination logic 8 is shown as being a part of the application 4. However, it should be noted that coordination logic 8 may also be implemented as a separate module if so desired. In addition to being stored in memory 3, application program 4 and coordination logic 8 may also be stored in mass storage 7 and 11, and on any other computer readable medium, such as a floppy disk, a CD-ROM, flash memory, magnetic tape, etc. From these other storage media, application program 4 and coordination logic 8 may be loaded into memory 3 for execution by processor 1.

While FIG. 1 illustrates system 10 as having a single processor, it should be understood that the present invention may be implemented in a multiple or distributed processor environment. Generally, processor 1 executes application 4 and coordination logic 8 in memory 3 to retrieve detail data from database 7 or database 11 via network 12, and to display it on display 6. An input device 13, such as a mouse and/or keyboard, may be used to input data and selections to system 10. While the present application discusses the display of textual data, other information such as images and the like may also be displayed.

B. Overview of Operating Environment

Before describing the invention in detail, an overview of the operating environment will be provided in order to facilitate a complete understanding of the invention. This overview is best shown by example.

Figure 2:
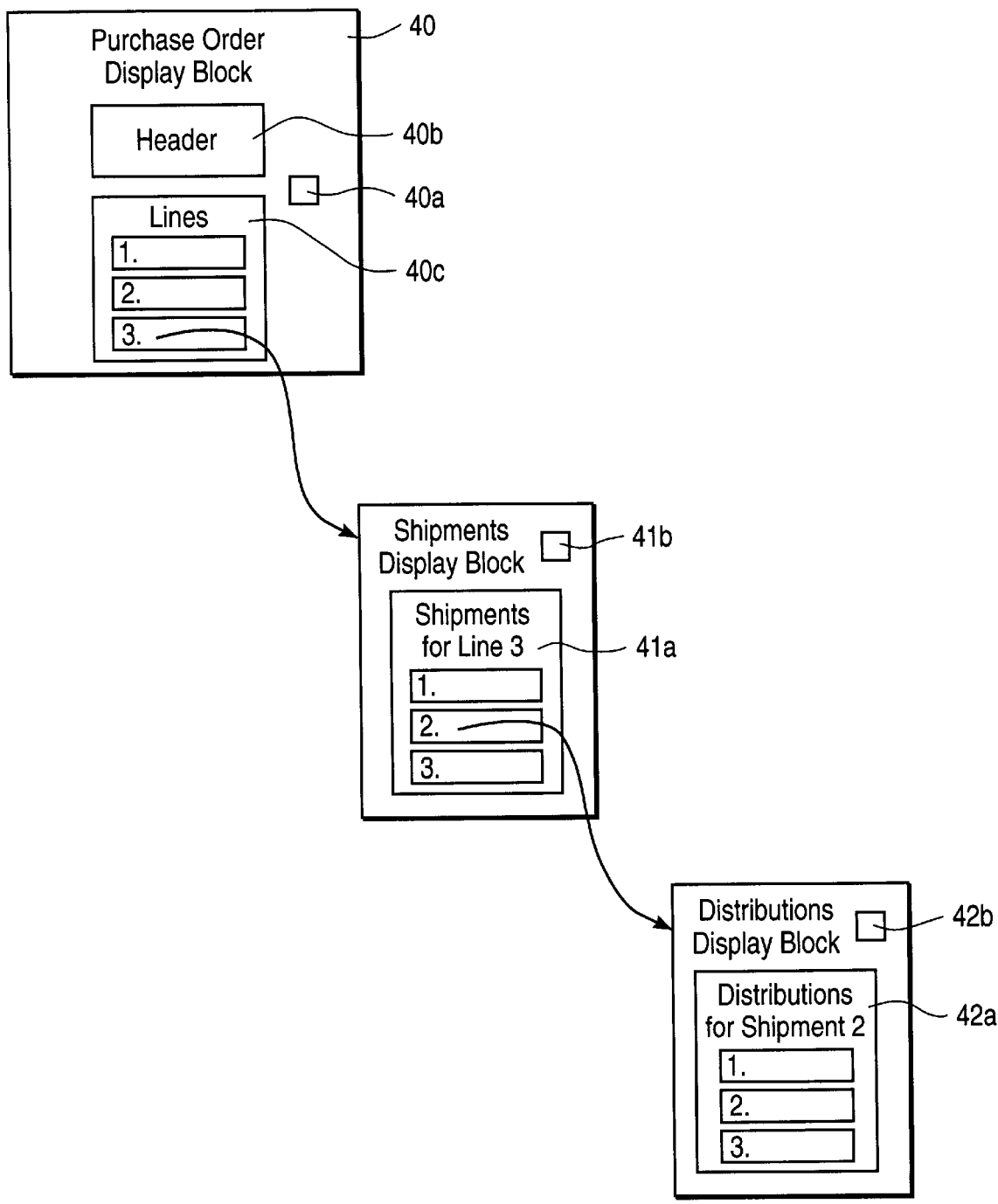
FIG. 2 illustrates retrieving and displaying a master purchase order data block and detail data block embodiment according to the present invention.

With reference to FIG. 2, three display blocks are shown to illustrate a four-tier hierarchy. In the purchase order display block 40, there is shown a header display block 40b and a lines display block 40c for displaying purchasing information associated with the header. Since the information displayed in the lines block 40c is keyed off of the header displayed in the header block 40b, a master-detail relation exists between these two display blocks. Likewise, a master-detail relation exists between lines block 40c and shipments display block 41a since display block 41a shows shipment data keyed off of a particular record (line 3 in this example) in the lines block 40c. Further, a master-detail relation exists between shipments block 41a and distributions block 42a since distributions block 42a shows distribution data keyed off of a particular shipment record (shipment 2 in this example) in the shipments block 41a.

At this point, it should be noted that master and detail display blocks may appear in different display blocks, or they may appear in the same display block. For example, the shipments block 41a and the distributions block 42b are displayed as separate display blocks. On the other hand, the header block 40b and the lines block 40c are displayed in the same display block (the purchase order display block). Both embodiments can be accommodated.

To enable a user to control the timing of detail data retrieval and display, there is provided a coordination control mechanism associated with each detail block. In the example shown, control mechanisms 40a, 41b, and 42b are associated with details blocks 40c, 41a, and 42a, respectively. The control mechanisms may take the form of a check box, as shown in FIG. 2, or they may take other forms such as a graphically depicted push-pin. The control mechanisms may be set/reset by simple manipulation of an input device, such as a mouse or a keyboard.

The control mechanism associated with a particular detail block determines when detail data for that detail block is retrieved. More specifically, when a control mechanism is set to "immediate"(e.g. when the control check box is "checked"), detail data is immediately retrieved and displayed in the associated detail block whenever a master record is selected and the detail display block is visible. On the other hand, if the control mechanism is set to "deferred" (e.g. the check box is "unchecked"), retrieval and display of detail data for the associated detail block is deferred until the user affirmatively requests the detail data. In addition, the associated detail block is cleared of detail data when a different master record is selected by a user. This clearing of the detail block eliminates the possibility of displaying detail data corresponding to one master record when a different master record has been selected. The function of the control mechanism will become more clear as the invention is further described.

C. Coordination Control Logic Flow

Figure 3:
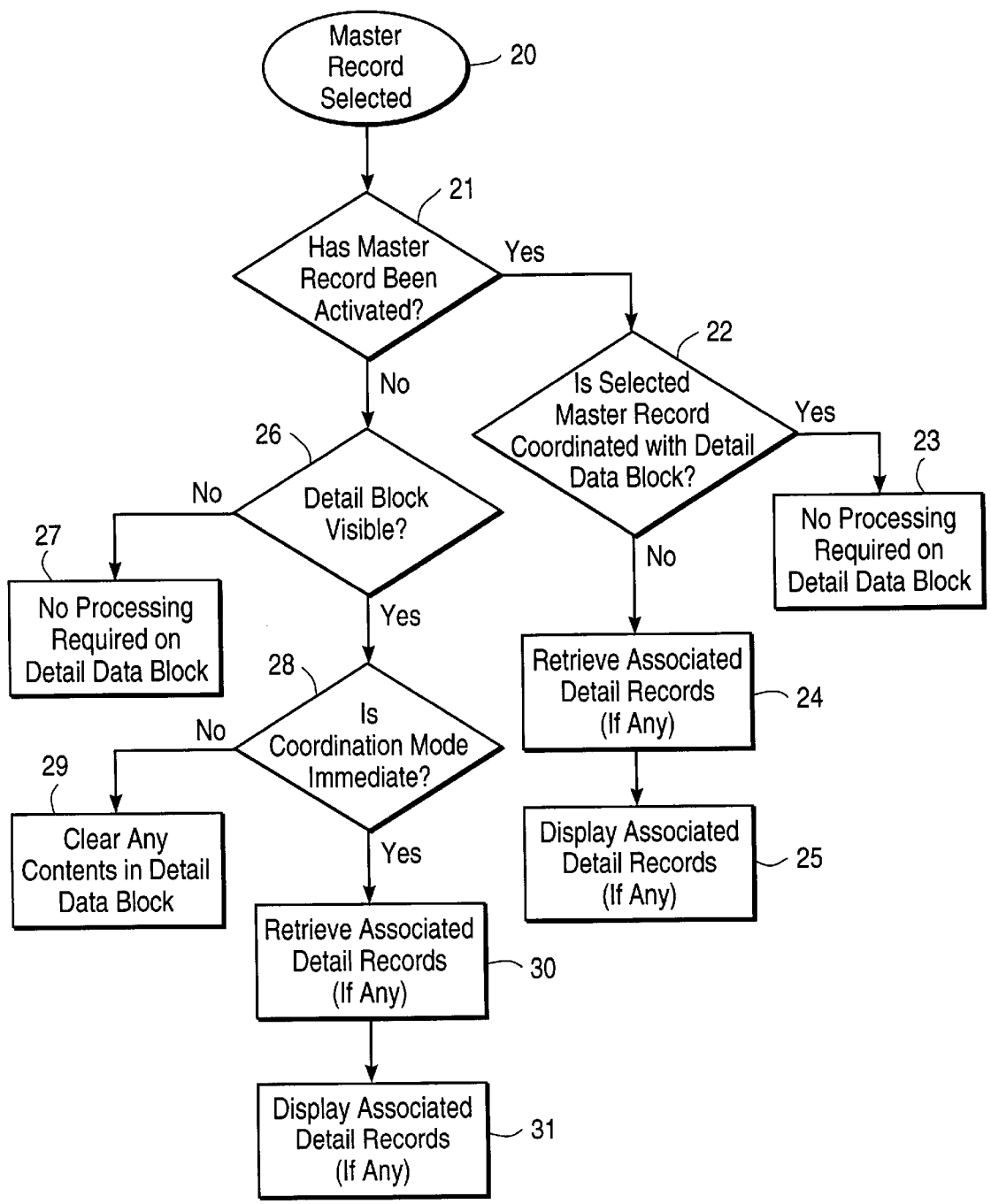
FIG. 3 illustrates a control flow diagram according to the present invention.

FIG. 3 illustrates the control logic flow for the coordination logic 8 shown in FIG. 1. With reference to the example shown in FIG. 2 and the flowchart of FIG. 3, the invention will now be described in detail.

A user begins interacting with system 10 (FIG. 1) by invoking the execution of application 4. Application 4 may be a program for controlling the purchasing process such as the example used thus far herein, or it may be any other application which allows a user to input, update, and manage data in a database. Application 4 may comprise a user interface layer, an application logic layer for implementing the necessary program logic, and a database layer for retrieving data from and writing data to the database. It is through application 4 that a user retrieves and selects master records from the database. A master record may be selected by positioning a mouse over the record and clicking the mouse button, by scrolling to the master record using the directional keys of a keyboard, or by any other means.

Once a master record is selected (logic block 20), the coordination logic 8 determines in logic block 21 whether the master record has been "activated". At this point, a distinction should be made between "selecting" a master record and "activating" it. When a user selects a master record, he is simply indicating to system 10 that this is the record in which he is currently interested. The user is not affirmatively instructing the system 10 to do anything. When the user activates a master record, on the other hand, he is affirmatively requesting that the detail data associated with that master record be retrieved. The user may activate a master record in a number of different ways, including moving the mouse pointer over the master record and double clicking, or selecting the master record and then moving the mouse pointer into the detail display block associated with the master record and clicking the mouse button. For example, line 3 in display block 40c may be activated by selecting line 3 and then moving the mouse pointer into the shipments display block 41a and clicking the mouse button.

If coordination logic 8 determines that a master record has been activated, then it proceeds further to determine in logic block 22 whether the detail display block associated with the master record already shows the detail data for that master record. If so, then no processing is necessary. To illustrate this point, suppose that the user activates line 3 of block 40c and that the shipments block 41a already shows the detail data for line 3. Since block 41a already contains the requested detail data, there is no need to retrieve it from the database. Hence, as shown in logic block 23, no processing is needed.

On the other hand, if coordination logic 8 determines that the detail data associated with the activated master record is not already displayed, then the coordination logic 8 retrieves the detail data associated with the activated master record (logic block 24) and displays (logic block 25) it in the detail display block associated with the activated record. It should be noted that when a user activates a master record, steps 24 and 25 are carried out regardless of the status of the coordination control mechanism associated with detail display block. For example, if line 3 in block 40c is activated, shipment data associated with line 3 is displayed in shipments block 41 regardless of whether the control mechanism 41b is set to "immediate" or "deferred". By activating a master record, the user is overriding the control mechanism.

Returning to logic block 21, if the coordination logic 8 determines that the master record has only been selected and not activated, then the coordination logic 8 determines in logic block 26 whether the detail display block associated with the selected master record is currently visible to the user. If not, then no processing is required. The rationale is that, since the detail block is not currently visible to the user, the data even if retrieved cannot be seen; hence, there is no point in retrieving the detail data for the selected master record. It should be noted that if the display block is not currently visible, no detail data is retrieved regardless of the status of the control mechanism associated with the detail block. For example, suppose that: (1) line 3 of block 40c is selected; (2) control mechanism 41b is set to "immediate"; and (3) display block 41a is not currently visible. In such a case, even though control mechanism 41b is set to "immediate", no detail data for line 3 is retrieved. This serves to eliminate unnecessary data traffic which, in turn, improves system performance.

Returning to logic block 26, if coordination logic 8 determines that the detail block associated with the selected master record is currently visible, then the coordination logic 8 proceeds to check (logic block 28) the status of the coordination control mechanism associated with the detail block. If the control mechanism is set to "immediate", then detail data associated with the selected master record is retrieved (logic block 30) from the database and displayed (logic block 31) in the detail block associated with the selected master record. On the other hand, if the control mechanism is set to "deferred", then no detail data is retrieved. In addition, the detail block is cleared (logic block 29) of any detail data. This is done to ensure that the detail data associated with one master record is never displayed when another master record has been selected.

D. Sample Operation

To illustrate the operation of the present invention, a sample sequence of actions will now be discussed with reference to the specific example shown in FIG. 2. For purposes of simplicity, it will be assumed for this example that block 42a is not displayed.

Suppose that a user has retrieved a plurality of header records and now wants to review them. Suppose further that the user wants to see the lines associated with each header record as he scrolls through them. Thus, he sets the control mechanism 40a to "immediate". As the user scrolls to each header record (in effect selecting each header record), the lines associated with that header record are automatically retrieved and displayed in block 40c. Suppose now that the user has found the header that he is searching for and wants to get some shipment information for some particular lines. Suppose further that the user wants to see the shipment information for each line as he scrolls through them. Thus, he sets the control mechanism 41b to "immediate". Now, as he scrolls through each line, the shipment data associated with that line is automatically retrieved and displayed in block 41a.

Suppose now that the user is finished looking at the information pertaining to this particular header and wants to quickly find another header. This time, he only wants to see the header information and is not interested in any lines information. Therefore, he sets the control mechanism 40a to "deferred". With this setting, no lines information will be retrieved as the user scrolls through the headers. In addition, as the user scrolls to the next header, the lines information currently displayed in block 40c will be cleared.

Suppose now that the user has found the header that he is looking for and wishes to see the lines information associated with that header. To obtain this information, the user activates the header (either by double clicking the mouse on the header or by selecting the header and clicking the mouse in block 40c). This causes the lines information associated with the header to be retrieved and displayed in block 40c. These steps are performed despite the fact that control mechanism 40a is still set to deferred. Suppose now that, for whatever reason, the user again activates the same header. Since the lines information for this header is already displayed in block 40c, no data is retrieved from the database.

As a final illustration, suppose that the user resets the control mechanism 41b for block 41a to "immediate" and closes the block so that it is no longer visible. Now, suppose the user scrolls through the lines currently displayed in block 40c. If block 41a were visible, shipment information corresponding to each line would be retrieved and displayed as that line is selected since mechanism 41b is set to "immediate". However, because block 41a is not currently visible, no shipment information is retrieved from the database.

As can be seen from the above description, the present invention eliminates a large amount of unnecessary data traffic. For example, detail data is retrieved only if the detail display block is currently visible, only if the user is interested in the information, and only if the information is not already displayed. At the same time, it provides increased usability and flexibility. A user may dictate that detail data be automatically retrieved each time a master record is selected. A user may also see and manipulate a number of different display blocks at the same time, in contrast to the modal windows approach. Overall, the present invention provides an optimal balance between efficiency and convenience.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A computer-implemented method for selectively displaying detail information associated with a selected master record, comprising the steps of:
   (a) determining, based on a user-controlled parameter value, whether detail information associated with said selected master record should be retrieved;
   (b) retrieving at least one detail record associated with said selected master record from a database, responsive to a determination that detail information associated with said selected master record should be retrieved;
   (c) displaying said at least one detail record in a detail display block associated with said selected master record;
   (d) determining, prior to step (a), whether said detail display block is currently being displayed; and
   (e) responsive to a determination that said detail display block is not currently being displayed, foregoing steps (a), (b) and (c) regardless of said user-controlled parameter value.

2. A computer-implemented method for selectively displaying detail information associated with a selected master record, comprising the steps of:
   (a) determining, based on a user-controlled parameter value, whether detail information associated with said selected master record should be retrieved;
   (b) retrieving at least one detail record associated with said selected master record from a database, responsive to a determination that detail information associated with said selected master record should be retrieved;
   (c) displaying said at least one detail record in a detail display block associated with said selected master record;
   (d) determining, prior to step (a), whether said selected master record has been activated;
   (e) in response to a determination that said selected master record has been activated:
      (i) foregoing steps (a), (b) and (c);
      (ii) retrieving at least one detail record associated with said selected master record from a database, regardless of said user-controlled parameter value; and
      (iii) displaying said at least one detail record in said detail display block associated with said selected master record.

3. An article of manufacture, comprising a computer readable medium having computer readable instructions contained thereon which, when executed by a computer, causes the computer to perform the steps of:
   (a) determining, based on a user-controlled parameter value, whether detail information associated with a selected master record should be retrieved;
   (b) retrieving at least one detail record associated with said sel record from a database, responsive to a determination that detail information associated with said selected master record should be retrieved;
   (c) displaying said at least one detail record in a detail display block associated with said selected master record;
   (d) determining, prior to step (a), whether said detail display block is currently being displayed; and
   (e) responsive to a determination that said detail display block is not currently being displayed, foregoing steps (a), (b) and (c) regardless of said user-controlled parameter value.

4. An article of manufacture, comprising a computer readable medium having computer readable instructions contained thereon which, when executed by a computer, causes the computer to perform the steps of:
   (a) determining, based on a user-controlled parameter value, whether detail information associated with a selected master record should be retrieved;
   (b) retrieving at least one detail record associated with said selected master record from a database, responsive to a determination that detail information associated with said selected master record should be retrieved;
   (c) displaying said at least one detail record in a detail display block associated with said selected master record;
   (d) determining, prior to step (a), whether said selected master record has been activated;
   (e) in response to a determination that said selected master record has been activated:
      (i) foregoing steps (a), (b) and (c);
      (ii) retrieving at least one detail record associated with said selected master record from a database, regardless of said user-controlled parameter value; and
      (iii) displaying said at least one detail record in said detail display block associated with said selected master record.

* * * * *